United States Patent [19]
Fujimoto

[11] Patent Number: 5,191,635
[45] Date of Patent: Mar. 2, 1993

[54] PATTERN MATCHING SYSTEM FOR SPEECH RECOGNITION SYSTEM, ESPECIALLY USEFUL FOR DISCRIMINATING WORDS HAVING SIMILAR VOWEL SOUNDS

[75] Inventor: Junichiroh Fujimoto, Yokohama, Japan

[73] Assignee: Ricoh Company, Ltd., Tokyo, Japan

[21] Appl. No.: 593,798

[22] Filed: Oct. 5, 1990

[30] Foreign Application Priority Data

| Oct. 5, 1989 | [JP] | Japan | 1-261104 |
| Mar. 5, 1990 | [JP] | Japan | 2-53017 |
| May 14, 1990 | [JP] | Japan | 2-123746 |

[51] Int. Cl.$^5$ ............................................. G10L 5/00
[52] U.S. Cl. ............................................. 395/2
[58] Field of Search ........................... 381/41-46; 395/2

[56] References Cited

U.S. PATENT DOCUMENTS

| 4,183,806 | 11/1988 | Nakamura et al. | 381/41 |
| 4,403,114 | 1/1983 | Sakoe | 381/42 |
| 4,489,434 | 12/1984 | Moshier | 381/43 |
| 4,761,815 | 8/1988 | Hitchcock | 381/43 |
| 4,979,212 | 12/1990 | Yamada et al. | 381/41 |
| 4,987,596 | 1/1991 | Ukita | 381/41 |

OTHER PUBLICATIONS

Y. Niimi, "Speech Recognition", Kyouritsu Publishing Co., 1979, pp. 68-71 and 100-109.
Fujimoto et al., "Applied Fuzzy System", Oomu Publishing Co., 1989, pp. 122-133.
P. Denes et al., "Spoken Digit Recognition Using Time-Frequency Pattern Matching", *The Journel of the Acoustical Society of America*, vol. 32, No. 11, Nov. 1960, pp. 1450-1455.

*Primary Examiner*—Michael R. Fleming
*Assistant Examiner*—Michelle Doerrler
*Attorney, Agent, or Firm*—Mason, Fenwick & Lawrence

[57] ABSTRACT

A pattern matching system for a speech recognition apparatus includes a dictionary for storing standard speech patterns, where each of the standard speech patterns are stored in the dictionary with two or more different pattern lengths, a converting part for converting an input speech pattern which has an arbitrary pattern length into at least one converted speech pattern which has one of the pattern lengths with which the standard speech patterns are stored in the dictionary depending on the arbitrary pattern length, and a collating part for collating the converted speech pattern with the standard speech patterns stored in the dictionary to obtain a standard speech pattern which has a largest degree of similarity to the converted speech pattern.

17 Claims, 14 Drawing Sheets

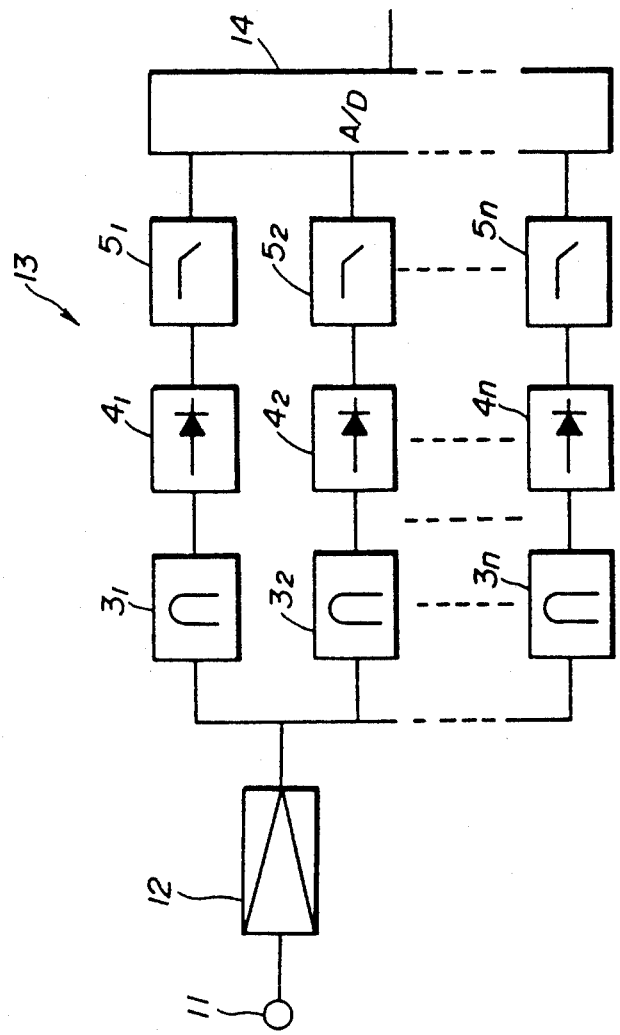
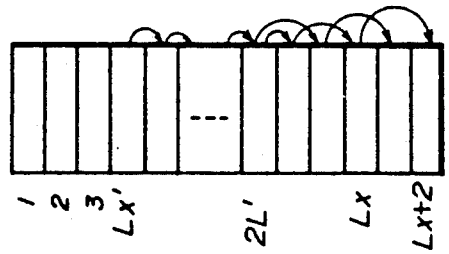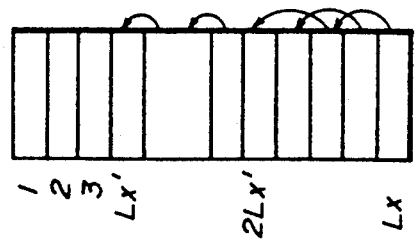

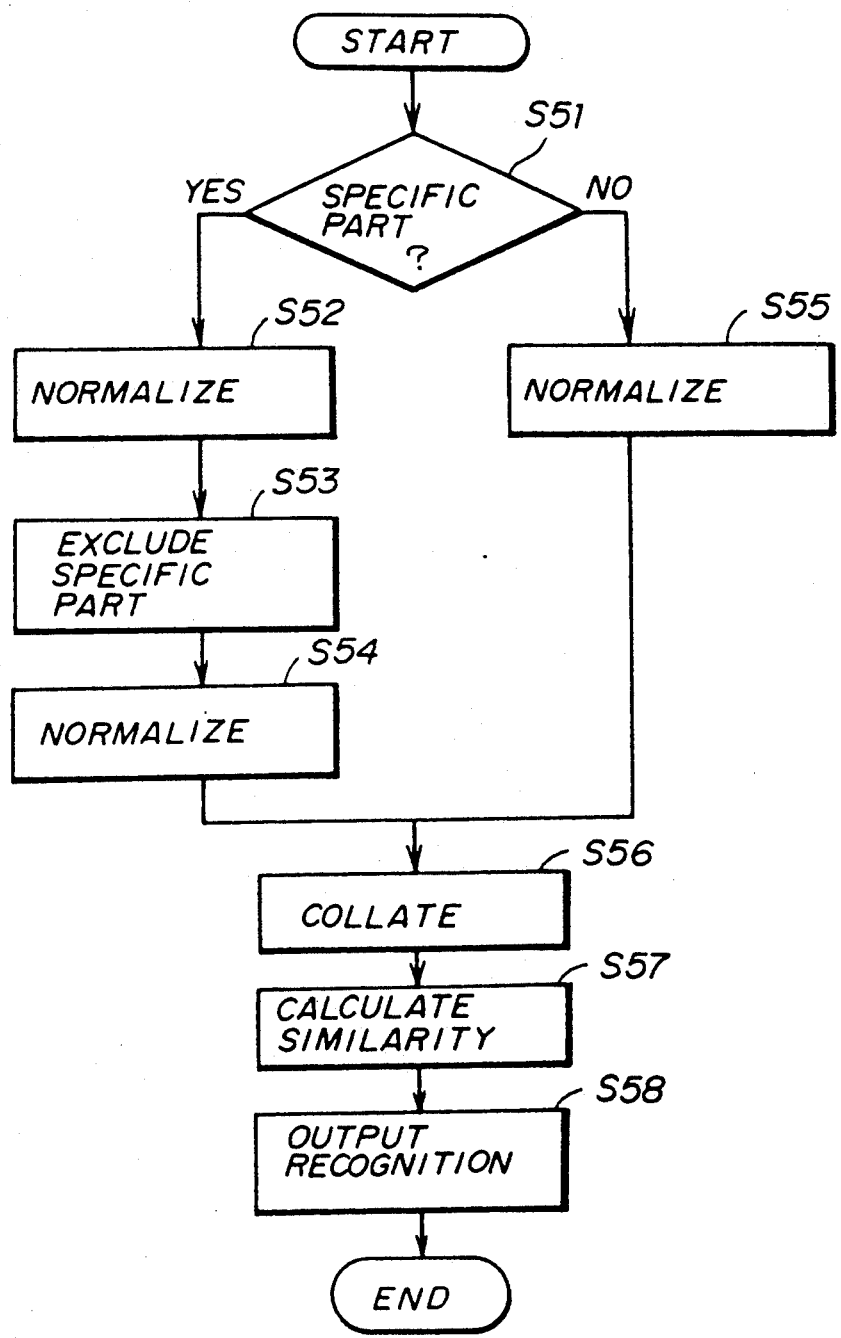

PATTERN MATCHING SYSTEM FOR SPEECH RECOGNITION SYSTEM, ESPECIALLY USEFUL FOR DISCRIMINATING WORDS HAVING SIMILAR VOWEL SOUNDS

BACKGROUND OF THE INVENTION

The present invention generally relates to pattern matching systems, and more particularly to a pattern matching system for speech recognition.

Presently, the speech recognition is generally made according to the pattern matching system. According to the pattern matching system, standard patterns are registered in advance, and an unknown speech pattern which is input is collated with the registered standard patterns to find a certain registered standard pattern which most closely resembles or is the same as the unknown speech pattern. This certain registered standard pattern is output as the recognition result.

FIG. 1 is a diagram for explaining an example of a conventional pattern matching system. FIG. 1(A) shows an input pattern of an input speech which is pronounced "tu", and FIG. 1(B) shows a standard pattern which corresponds to "tu". The pattern matching system compares the input pattern with the standard pattern and obtains a degree of similarity (resemblance) of the standard pattern with respect to the input pattern.

There basically are two methods of collating the patterns depending on whether or not the length of speech varies, as described in Niimi, "Speech Recognition", Kyouritsu Publishing Co., for example. A first method carries out the time normalization of the pattern non-linearly, and will hereinafter be referred to as a non-linear matching method. The dynamic programming (DP) matching which is sometimes also referred to as the dynamic time warping is a typical non-linear matching method. On the other hand, a second method carries out the time normalization of the pattern linearly, and will hereinafter be referred to as a linear matching method.

The non-linear matching method requires a large number of operations when compared to the linear matching method. For this reason, it is desirable to use the linear matching method if a sufficiently high matching accuracy can be obtained thereby.

The linear matching method may be categorized into two types, that is, a first type which matches the length of one of two patterns which are collated to the length of the other by time normalization, and a second type which first converts the length of all of the patterns to a predetermined length by time normalization. The first type requires the time normalization process every time two patterns are collated. On the other hand, the second type also converts the length of the standard patterns to the predetermined length when registering the standard patterns, and once the length of the unknown speech pattern is converted into the predetermined length, there is no need to carry out calculations associated with the time normalization when collating the unknown speech pattern with the registered standard patterns. Hence, the number of operations required when collating the unknown speech pattern with the registered standard patterns can be reduced compared to the first type.

However, the problems described below exist in the conventional pattern matching system employing the second type of linear matching method.

For example, a speech pattern shown in portion B of FIG. 2 is obtained when a speech "utumuku" is sampled at a sampling rate of 10 ms to 20 ms. Short words are generally 5 ms to 600 ms long, while long words are generally in the rage of 1.5 s. Hence, the above described sampling at the sampling rate of 10 ms to 20 ms will result in 5 to 60 samples for the short words and approximately 150 samples for the long words, and the number of samples is in most cases converted into 8 or 16 samples by time normalization.

Hence, when the word "tu" is taken as an example of a short word and the word "utumuku" is taken as an example of a long word, 50 samples are obtained for the word "tu" while approximately 120 samples are obtained for the word "utumuku". But when the 50 samples of the word "tu" is converted into 8 samples by the time normalization, the number of samples for "t" is converted into 1 sample and the number of samples for "u" is converted into approximately 7 samples. But when the 120 samples of the word "utumuku" is converted into 8 samples, the consonant (sounds) "t", "m" and "k" virtually do not appear on the converted pattern as may be seen from portion A of FIG. 2. In other words, when the time normalization is carried out, the consonants are preserved for the short words, but the consonants are not preserved and only the vowels remain for the long words. As a result, the long word must be recognized using only the vowels. Therefore, there is a problem in that the words having the same arrangement of vowels cannot be distinguished from each other, and in an extreme case, the word "utumuku" may be recognized as the word "u" because the patterns of the two words become approximately the same after the time normalization of the samples.

SUMMARY OF THE INVENTION

Accordingly, it is a general object of the present invention to provide a novel and useful pattern matching system in which the problem described above is eliminated.

Another and more specific object of the present invention is to provide a pattern matching system for a speech recognition apparatus comprising dictionary means for storing standard speech patterns, where each of the standard speech patterns are stored in the dictionary means with two or more different pattern lengths, converting means for converting an input speech pattern which has an arbitrary pattern length into at least one converted speech pattern which has one of the pattern lengths with which the standard speech patterns are stored in the dictionary means depending on the arbitrary pattern length, and collating means for collating the converted speech pattern with the standard speech patterns stored in the dictionary means to obtain a standard speech pattern which has a largest degree of similarity to the converted speech pattern. According to the pattern matching system of the present invention, it is possible to considerably reduce the number of operations required when collating the input speech pattern with the standard speech patterns when compared to the conventional system, and it is possible to carry out the pattern matching with a high accuracy.

Still another object of the present invention is to provide a pattern matching system for a speech recognition apparatus comprising dictionary means for storing first and second standard speech patterns having a predetermined pattern length with respect to one word when an energy level at one of beginning and end parts of the word is lower than a predetermined level, where the first standard pattern corresponds to the entire word and the second standard pattern corresponds to the word excluding the one of beginning and end parts, converting means for converting an input speech pattern which has an arbitrary pattern length into a converted speech pattern which has the predetermined pattern lengths, and collating means for collating the converted speech pattern with both the first and second standard speech patterns stored in the dictionary means and recognizes a predetermined word as having the largest degree of similarity when one of the first and second standard patterns corresponding to the predetermined word has a largest degree of similarity out of all of the standard patterns stored in the dictionary means. According to the pattern matching system of the present invention, it is possible to carry out the pattern matching with a high accuracy even when a consonant at the beginning or end part of the word drops out in the input speech pattern.

A further object of the present invention is to provide a pattern matching system for a speech recognition apparatus comprising dictionary means for storing first and second standard speech patterns having a predetermined pattern length with respect to one word when an energy level at one of beginning and end parts of the word is lower than a predetermined level and has spectral components concentrated in a high frequency region, where the first standard pattern corresponds to the entire word and the second standard pattern corresponds to the word excluding the one of beginning and end parts, converting means for converting an input speech pattern which has an arbitrary pattern length into a converted speech pattern which has the predetermined pattern lengths, and collating means for collating the converted speech pattern with both the first and second standard speech patterns stored in the dictionary means and recognizes a predetermined word as having the largest degree of similarity when one of the first and second standard patterns corresponding to the predetermined word has a largest degree of similarity out of all of the standard patterns stored in the dictionary means. According to the pattern matching system of the present invention, it is possible to carry out the pattern matching with a high accuracy even when a consonant at the beginning or end part of the word drops out in the input speech pattern.

Other objects and further features of the present invention will be apparent from the following detailed description when read in conjunction with the accompanying drawings.

BRIEF DESCRIPTION OF THE DRAWINGS

FIGS. 4 A and 4B are diagrams for explaining a time normalization carried out by a register shown in FIG. 3;

FIG. 5 is a system block diagram showing an embodiment of a bandpass filter bank together with a microphone, an amplifier and an A/D converter of the first embodiment shown in FIG. 3;

FIG. 16 is a flow chart for explaining an operation of the microcomputer when the microcomputer is used to carry out the operation of the system shown in FIG. 14.

DESCRIPTION OF THE PREFERRED EMBODIMENTS

Figure 1A:
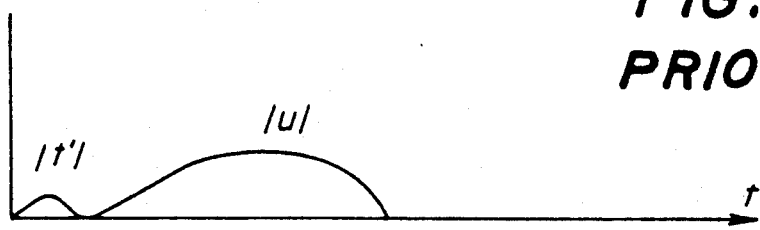
FIG. 1 is a diagram for explaining an example of a conventional pattern matching system.
Figure 1B:
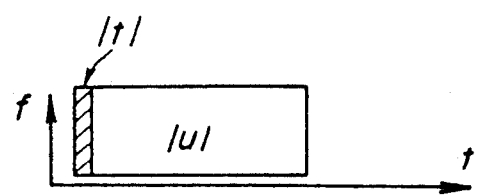
Figure 2A:
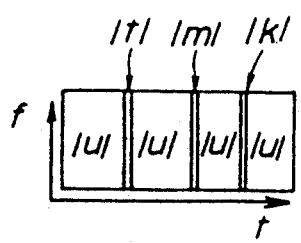
FIG. 2 is a diagram for explaining a time normalization of samples of a long word.
Figure 2B:
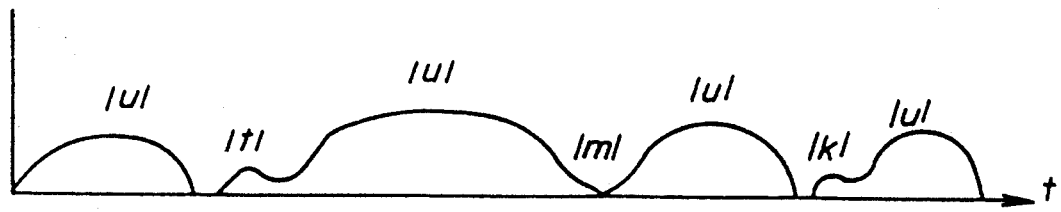
Figure 3:
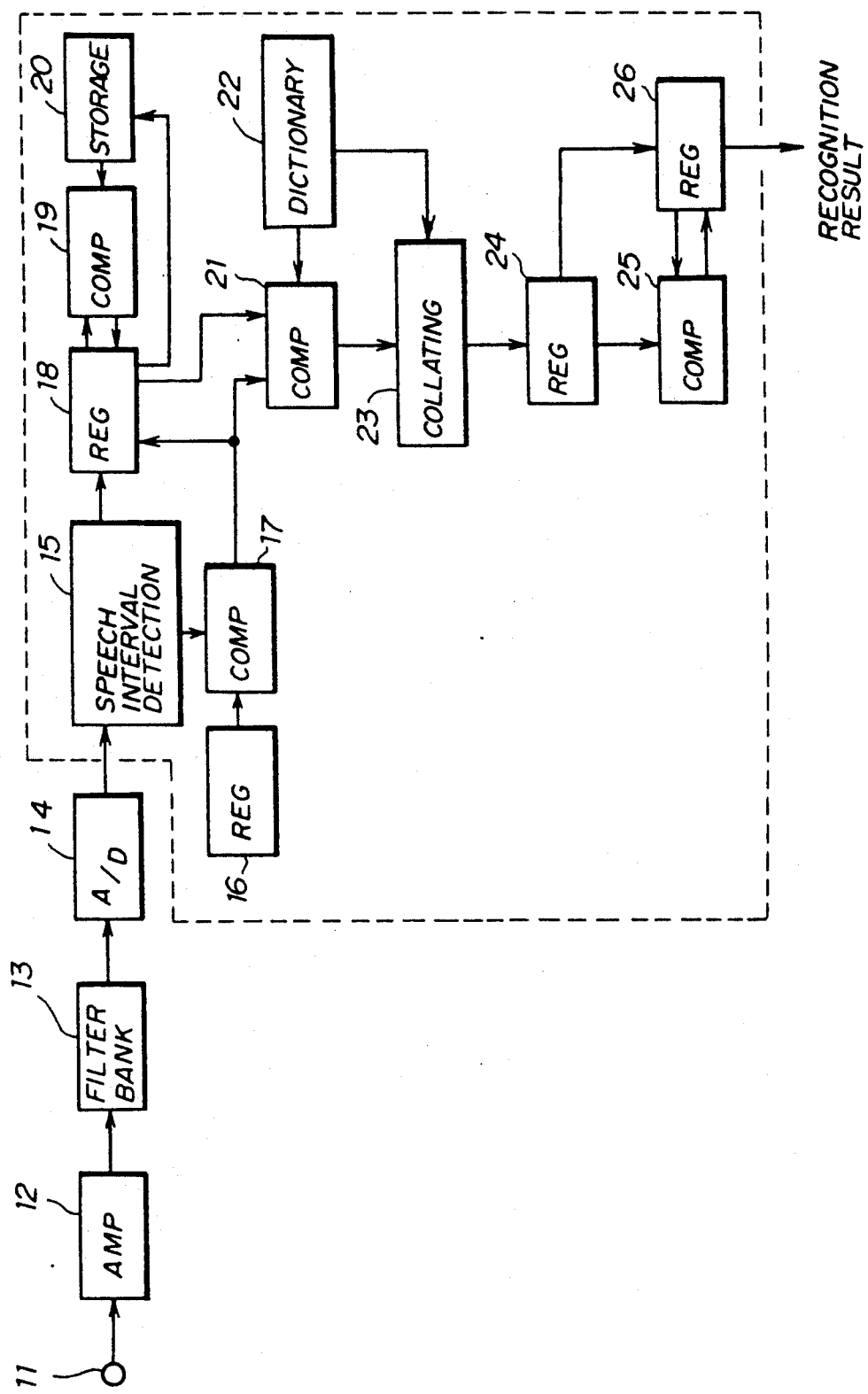
FIG. 3 is a system block diagram showing a first embodiment of a pattern matching system according to the present invention.

FIG. 3 shows a first embodiment of a pattern matching system according to the present invention applied to a speech recognition apparatus. The speech recognition apparatus includes a microphone 11, an amplifier 12, a bandpass filter bank 13, a analog-to-digital (A/D) converter 14, a speech interval detector 15, a register 16, a comparator 17, a register 18, a comparator 19, a threshold value storage 20, a comparator 21, a dictionary 22, a collating part 23, a register 24, a comparator 25 and a register 26 which are connected as shown.

It is assumed for the sake of convenience that standard speech patterns which are normalized to two or more kinds of frame lengths are prestored in the dictionary 22.

An unknown input speech which is to be recognized in input from the microphone 11 and is supplied to the bandpass filter bank 13 via the amplifier 12. The bandpass filter bank 13 analyzes the input speech in a predetermined number of frequency bands. The A/D converter 14 quantizeds an output signal of the bandpass filter bank 13 into 12 bits, for example, and the 12-bit data is supplied to the speech interval detector 15. The method of detecting the speech interval is known, and the method disclosed in Shinbi, "Speech Recognition", Kuoritsu Publishing Co. may be used, for example. The detected speech interval is supplied to the register 18 as an input speech pattern.

The register 16 prestores several kinds of frame lengths to which the input speech pattern is to be normalized. When the speech interval of the 12-bit data is detected, the speech interval detector 15 supplied to the comparator 17 a frame length signal which indicates the frame length of the detected speech interval. The comparator 17 compares the frame length of the detected speech interval with the register frame lengths in the register 16, and selects one or two registered frame lengths which are closest to the frame length of the detected speech interval. A frame length signal which indicates the selected registered frame length is supplied to the register 18 and the comparator 21.

The register 18 subjects the input speech pattern to a time normalization, that is, an adjustment of the frame length, so as to match the frame length which is indicated by the frame length signal from the comparator 17. For example, it is assumed for the sake of convenience that the input speech pattern has a frame length $L_x$, and the register 18 is to expand the input speech pattern to a frame length $L_x+2$. A simple method of expansion is to divide the frame length of the input speech pattern by a certain number which is one greater than the number of frames to be inserted so as to determine the inserting part within the register 18. In the above described case, the certain number is $L_x/3$ and the inserting part is obtained as $L_x$, which is an integer. First, the $L_x$th data is copied to the $(L_x+2)$th frame, the $(L_x-1)$th data is copied to the $(L_x+1)$th frame, and the copy process is repeated similarly thereafter as shown in FIG. 4A. The $2L_x'$th data is copied to the $(2L_x'+1)$th frame and the $(L_x'+2)$th frame. Next, the $(L_x'-1)$th data is copied to the $L_x'$th frame and the copy process is repeated similarly thereafter until the $L_x'$th data is copied to the $(L_x'+1)$th frame.

Alternatively, the register 18 may expand the input speech pattern to a frame length $L_x-2$. In this case, the $(L_x'+1)$th data is copied to the $L_1'$th frame as shown in FIG. 4B. The $(L+n)$th data is copied to the $(L_x+n-1)$th frame and the copy process is repeated similarly thereafter until the $2L_x'$th data is copied to the $(2L_x'+2)$th frame. Then, the $(L_x'+n)$th data is copied to the $(L_x'+n-2)$th frame and the copy process is repeated until the $L_1$th data.

The time normalization in the register 18 is described above as addition or subtraction of two. The binarization is carried out when the pattern length is adjusted to a predetermined length. However, it is not essential to carry out the binarization when making the recognition using the method described in Fujimoto et al., "Applied Fuzzy System", Oomu Publishing Co., for example.

In this embodiment, the binarization is carried out by the comparator 19 for every frame. The comparator 19 shifts a total of the entire data amounting to one frame from the register 18 by three bits, that is, multiplies ⅛ to the total, and supplies the divided data to the threshold value storage 20 as a threshold value. Thereafter, the comparator 19 compares the vales of the frames received from the register 18 with the threshold value stored in the threshold value storage 20, and stores a data "1" in the register 18 when the value of the frame is greater than the threshold value and otherwise stores a data "0" in the register.

The comparator 21 compares the frame length of each word which is read from the dictionary 22 with the frame length of the input speech which is received from the register 18, and loads the patterns of the dictionary 22 into the collating part 23 only when the compared values match. The collating part 23 collates the patterns of the dictionary 22 with the pattern which is received from the register 18 via the comparator 21 and calculates the degree of similarity. The degree of similarity is stored in the register 24 which is initially cleared to zero. The degree of similarity "0" is stored in the register 24 when the frame lengths differ and no collating takes place in the collating part 23.

The above described operation is repeated until an end signal which indicates the end of the patterns registered in the dictionary 22 is received from the dictionary 22. Thereafter, the degree of similarity which is stored at the first location within the register 24 is transferred to the register 26 as a maximum degree of similarity, and the comparator 25 compares the degree of similarity which is stored in the register 26 with the degrees of similarity which are stored at the second and subsequent locations within the register 24. When the degree of similarity stored in the register 24 is greater than the degree of similarity stored in the register 25, the degree of similarity in the register 24 is transferred to the register 25 as a new maximum degree of similarity. The maximum degree of similarity is stored in the register 26 after all of the degrees of similarity are compared, and the word which corresponds to the maximum degree of similarity is output from the register 26 as the recognition result.

FIG. 5 shows an embodiment of the bandpass filter bank 13 together with the microphone 11, the amplifier 12 and the A/D converter 14. The bandpass filter bank 13 includes bandpass filters $3_1$ through $3_n$, rectifying circuits $4_1$ through $4_n$, and lowpass filters $5_1$ through $5_n$ which are connected as shown. A signal which is output from the bandpass filter $3_i$ is rectified in the rectifying circuit $4_i$, and is passed through the lowpass filter $5_i$ which is provided to average the time, where $i=1, 2, \ldots, n$. As a result, a power spectrum is output from the lowpass filter $5_i$. The power spectrums from the lowpass filters $5_1$ through $5_n$ are added to obtain the total power of speech and then subjected to the A/D conversion in the A/D converter 14. The power spectrum output from the A/D converter 14 is used to separate the speech interval from the surrounding noise, that is, the so-called speech interval extraction is made. However, the method of speech interval extraction is not limited to this embodiment, and various known methods may be used. For example, a method proposed in Shinbi, "Speech Recognition", Kuoritsu Publishing Co. may be used for the speech interval extraction.

Figure 6:
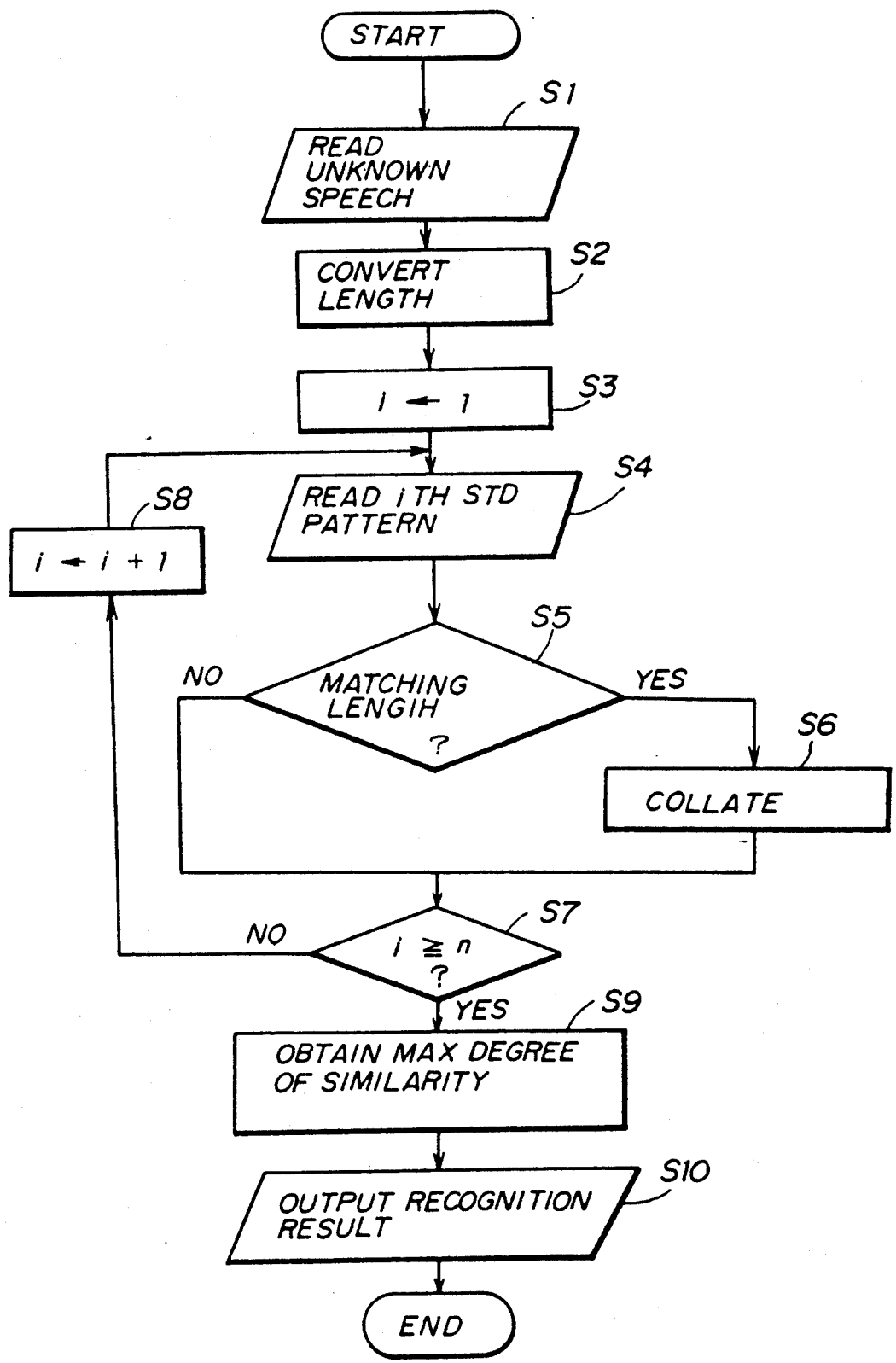
FIG. 6 is a flow chart for explaining an operation of a microcomputer when the microcomputer is used to carry out the operation of the first embodiment.

In FIG. 3, a part of the speech recognition apparatus surrounded by a phantom line may be realized by a combination of a microcomputer and a memory. FIG. 6 is a flow chart for explaining an operation of the microcomputer when this combination is employed.

In FIG. 6, a step S1 reads the unknown input speech to obtain a pattern length L of the input speech, and a step S2 converts the length L of the input speech according to a predetermined rule. For example, the pattern length is converted into a length $L_l$ when $L>L_a$, a length $L_2$ when $L_a \geq L \geq L_b$, and $L_3$ when $L_b>L$. In other words, the step S2 converts the time length of the input speech but does not make a conversion with respect to the frequency.

A step S3 sets i to "0", and a step S4 reads the ith standard pattern. Then, a step S5 judges whether or not the input speech pattern which has the converted length matches the length of the ith standard pattern. A step S6 collates the input speech pattern and the ith standard pattern only when the judgement result in the step S5 is YES. Since the two patterns which are collated in the step S6 have the same length, there is no need to convert the length of the patterns at the collating step. When the judgement result in the step S5 is NO or after the step S6, a step S7 judges whether or not $i \geq n$, where n denotes the number of standard patterns registered in the dictionary. When the judgement result in the step S7 is NO, a step S8 increments i by one and the process returns to the step S4.

When the judgement result in the step S7 becomes YES, a step S9 searches for the standard pattern having the largest degree of similarity to the input speech pattern, and a step S10 outputs the standard pattern having the largest degree of similarity as the recognition result.

When the unknown input speech pattern A is converted into a length $L_j$, where $j=1, 2, 3$, the input speech pattern A may be described by the following formula (1).

$$A = \{A_1, A_2, \ldots, A_{Lj}\} \quad (1)$$

The ith standard pattern $B_i$ may be described by the following formula (2).

$$B_i = \{B_{1i}, B_{2i}, \ldots, B_{Lji}\} \quad (2)$$

In the above formulas (1) and (2), $A_1, A_2, \ldots, B_{1i}, B_{2i}, \ldots, B_{Lji}$ are vectors made up of the output signals of the bandpass filter bank 13.

A distance $D_i$ which is used to judge the degree of similarity at the collating step may be described by the following formula (3).

$$D_i = \sum_{k=1}^{L_j} \sum_{m=1}^{M} |A_{mk} - B_{mki}| \quad (3)$$

The formula (3) described above is sometimes referred to as the urban distance. It is of course possible to use other distances for judging the degree of similarity at the collating step.

The step S9 described above may search for the standard pattern having the largest degree of similarity to the input speech pattern by obtaining the minimum distance $D_i$. Those standard patterns which have a length different from that of the input speech pattern are not collated with the input speech pattern in the step S6, and thus, and the value "0" is stored as the degree of similarity of such standard patterns. Of course, in the case where the distance $D_i$ is stored to describe the degree of similarity, an infinitely large value is stored for such standard patterns.

In the above described case, the length of the input speech pattern is converted into only one of the lengths $L_1$, $L_2$ and $L_3$. For this reason, when a word at the time of the registration has the length $L_a$, this word is converted into a standard pattern having the length $L_2$. But when the same word is input at the time of the speech recognition, the length of this word may be $L_a+1$ and slightly longer than that at the time of the registration. In this case, the input speech pattern is converted into the length $L_l$ and will not be collated with the standard pattern having the length $L_2$. As a result, a correct speech recognition is not carried out, and an erroneous recognition result will be output. This phenomenon occurs when the input speech pattern has a length in the vicinity of the length $L_a$ or $L_b$.

Next, a description will be given of a modified rule which may be used in place of the predetermined rule so as to prevent the above described phenomenon.

According to the modified rule, the pattern length L is converted according to the following six rules.

1) The pattern length L is converted into the length $L_1$ when both conditions $L > L_a$ and $L > L_a + (L_a - L_b)/2$ are satisfied.

2) The pattern length L is converted into the lengths $L_1$ and $L_2$ when both conditions $L > L_a$ and $L \leq L_a + (L_a - L_b)/2$ are satisfied.

3) The pattern length L is converted into the lengths $L_1$ and $L_2$ when both conditions $L_a \geq L \geq L_b$ and $L > L_b + (L_a - L_b)/2$ are satisfied.

4) The pattern length L is converted into the lengths $L_2$ and $L_3$ when both conditions $L_a \geq L \geq L_b$ and $L \leq L_b + (L_a - L_b)/2$ are satisfied.

5) The pattern length L is converted into the lengths $L_2$ and $L_3$ when both conditions $L_b > L$ and $L > L_b - (L_a - L_b)/2$ are satisfied.

6) The pattern length L is converted into the lengths $L_2$ and $L_3$ when both conditions $L_b > L_a$ and $L \leq L_b - (L_a - L_b)/2$ are satisfied.

By using the modified rule described above, the pattern length L is converted into two lengths when the pattern length L is in the vicinity of the length $L_a$ or $L_b$. As a result, there is always a corresponding standard pattern having a length identical to that of the input speech pattern, and the recognition accuracy is greatly improved compared to the case where the predetermined rule is used.

In the conventional system in which the input speech pattern is converted into one constant length, only the distance described by the formula (3) is required for the speech recognition. But in this embodiment, the input speech pattern is converted into one or two lengths, and the distance described by the formula (3) must be normalized by the converted lengths of the input speech pattern. On the other hand, Fujimoto et al., "Applied Fuzzy System", Oomu Publishing Co. proposes a method which does not require normalization of the distance for the speech recognition.

Figure 7:
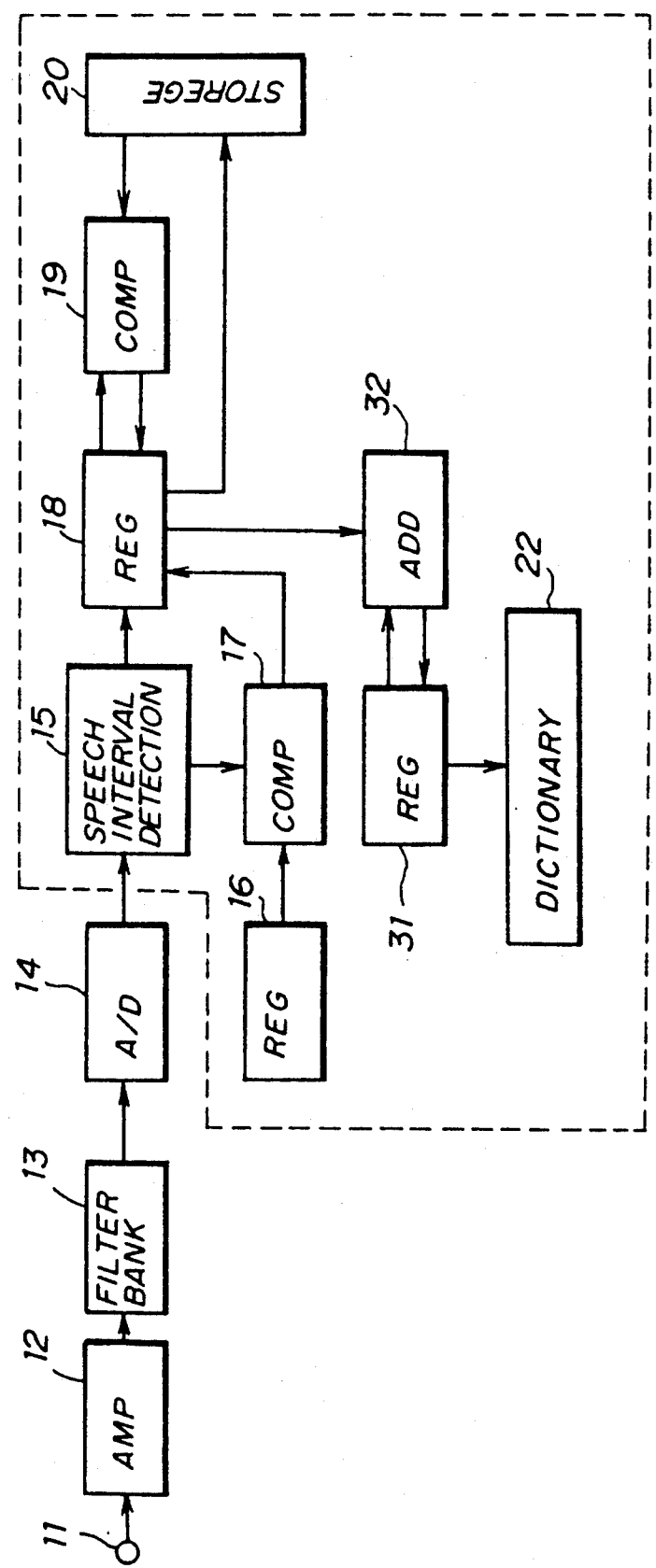
FIG. 7 is a system block diagram showing only an essential part of the speech recognition apparatus related to registration of standard patterns.

Next, a description will be given of a process of registering the standard patterns in the dictionary. FIG. 7 shows only an essential part of the speech recognition apparatus related to the registration of the standard patterns. In FIG. 7, those parts which are the same as those corresponding parts in FIG. 3 are designated by the same reference numerals, and a description thereof will be omitted.

The operation of the system shown in FIG. 7 is basically the same as that of the system shown in FIG. 3 up to the generation of the binary pattern in the register 18. The contents of a register 31 are initially cleared to "0". An adder 32 adds the pattern within the register 18 and a corresponding content of the register 31 and stores the sum in the register 31. As a result, it is possible to obtain an average pattern of a certain word which is spoken by the operator a plurality of times, and register the average pattern as the standard pattern of the certain word. For the sake of convenience, it is assumed that the certain word is spoken three times by the operator and the average pattern is obtained therefrom.

Of course, it is not essential to register the average pattern. When not registering the average pattern, the pattern within the register 18 may be stored directly in the register 31 as the standard pattern.

First, the adder 32 adds a first pattern of the certain word which is spoken first and is stored in the register 18 and a pattern "0" which is stored in the register 31, and stores a first sum into the register 31. Second, the adder 32 adds a second pattern of the certain word which is spoken second and is stored in the register 18 and the first sum which is stored in the register 31, and stores a second sum into the register 31. Third, the adder 32 adds a third pattern of the certain word which is spoken third and is stored in the register 18 and the second sum which is stored in the register 31, and stores a third sum into the register 31. The third sum is stored in the dictionary 22 as the standard pattern of the certain word. The above described operation is carried out for each word which is to be registered in the dictionary 22. In order to save the contents of the dictionary 22 even when a power failure occurs, for example, it is of course desirable that the dictionary 22 is a non-volatile memory such as a floppy disk.

Figure 8:
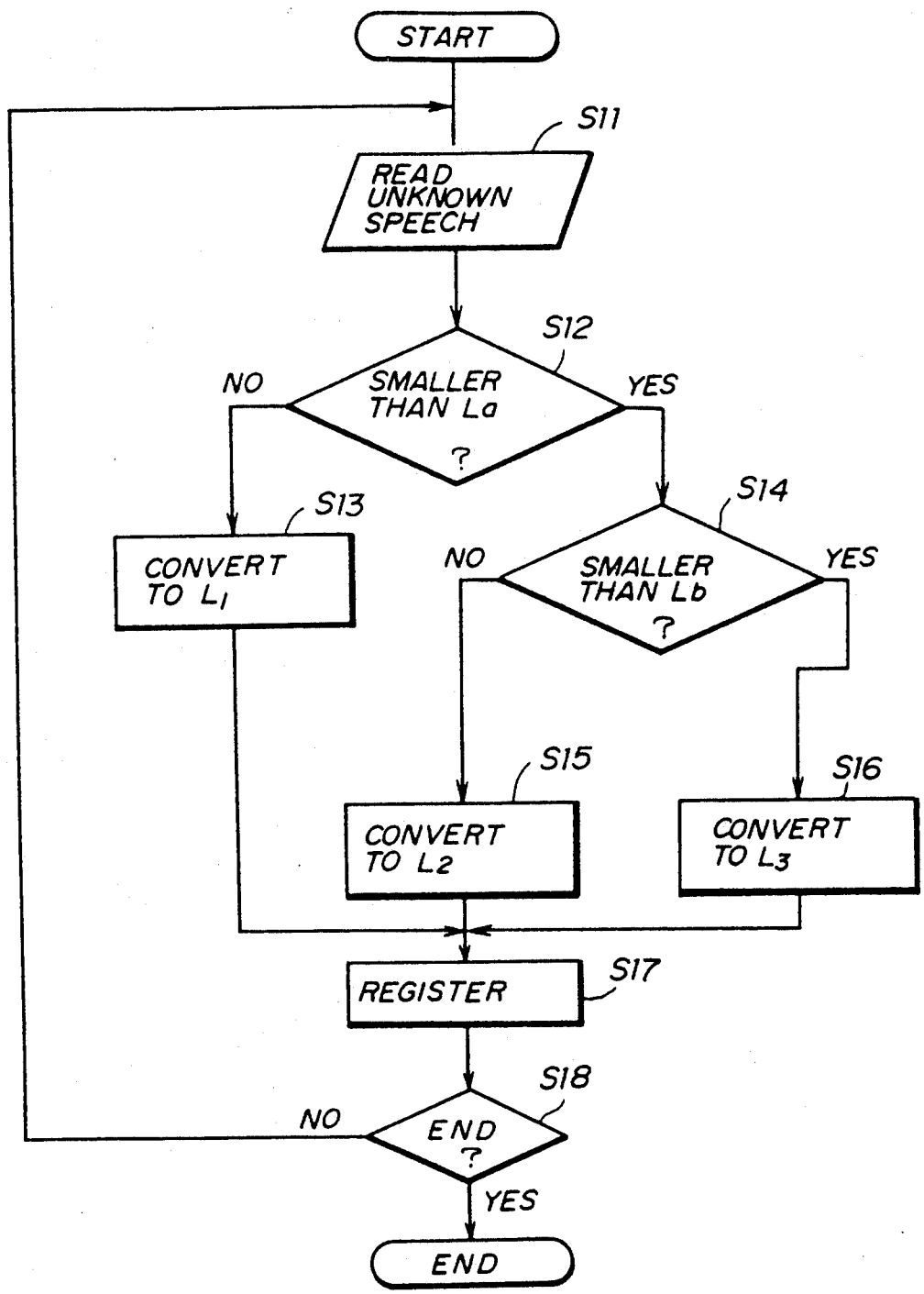
FIG. 8 is a flow chart for explaining an operation of the microcomputer when the microcomputer is used to carry out the operation of the system shown in FIG. 7.

In FIG. 7 a part of the speech recognition apparatus surrounded by a phantom line may be realized by a combination of a microcomputer and a memory. FIG. 8 is a flow chart for explaining an operation of the microcomputer when this combination is employed.

In FIG. 8, a step S11 reads the unknown input speech which is to be registered and obtains a pattern length L of the input speech. A step S12 judges whether or not the pattern length L is smaller than the length $L_a$. When the judgement result in the step S12 is NO, a step S13 converts the pattern length L into the length $L_1$. On the other hand, when the judgement result in the step S12 is YES, a step S14 judges whether or not the pattern length L is smaller than the length $L_b$.

When the judgement result in the step S14 is NO, a step S15 converts the pattern length L into the length $L_2$. On the other hand, when the judgement result in the step S14 is YES, a step S16 converts the pattern length L into the length $L_3$. As a result, the predetermined rule is used to convert the pattern length L into the length $L_1$ when $L > L_a$, into the length $L_2$ when $L_a \geq L \geq L_b$ and $L_a > L_b$, and into the length $L_3$ when $L_b > L$. A step S17 registers the input speech pattern having the converted length $L_1$, $L_2$ or $L_3$ in the dictionary as the standard pattern. A step S18 judges whether or not all of the standard patterns are registered in the dictionary, and the process ends when the judgement result in the step S18 becomes YES.

When recognizing words which are generally used in conversation, it is desirable to set the length $L_1$ to approximately 1200 ms and the length $L_2$ to approximately 800 ms, and make the length $L_1$ correspond to 32 samples, the length $L_2$ correspond to 16 samples and the length $L_3$ correspond to 8 samples.

Of course, the process shown in FIG. 8 may be modified when using the modified rule described above in place of the predetermined rule.

Normally, a minimum frame length is $35 \pm 30\%$ and a maximum frame length is $150 \pm 30\%$ for normal conversation, where one frame is 10 ms, for example. Hence, four kinds of frame lengths can generally cover the frame lengths of 17 to 226 frames. That is, the speech pattern having a frame length of 17 to 33 frames can be represented by 25 frames, a frame length of 34 to 64 frames can be represented by 49 frames, a frame length of 65 to 121 frames can be represented by 93 frames, and a frame length of 122 to 226 frames can be represented by 174 frames.

Hence, when registering the standard patterns in the dictionary, the four kinds of frame lengths described above may be used. In other words, when the same input speech which is to be registered is spoken three times by the operator and an average value $f_a$ is 17 to 33 frames, this input speech is registered as a standard pattern having a frame length of 25 frames. Similarly, the input speech is registered as a standard pattern having a frame length of 49 frames when the average value $f_a$ is 34 to 64 frames, a standard pattern having a frame length of 93 frames when the average value $f_a$ is 65 to 121 frames, and a standard pattern having a frame length of 174 frames when the average value $f_a$ is 122 to 226 frames.

When making the speech recognition in this case, the input speech pattern is converted into one or two frame lengths depending on a frame length $f_i$ of the input speech pattern. The input speech pattern is converted into a frame length of 35 frames when $f_i \leq 25$, frame lengths of 25 and 49 frames when $26 \leq f_i \leq 49$, frame lengths of 49 and 93 frames when $50 \leq f_i \leq 93$, frame lengths of 93 and 174 frames when $94 \leq f_i \leq 174$, and a frame length of 174 frames when $175 \leq f_i$.

As described above when explaining the problems of the prior art, the linear matching method is effective when the speech pattern is complete and no dropout or added noise exists in the speech pattern. However, because the linear matching method compresses or expands the speech pattern linearly although the speech pattern in general undergoes non-linear compression or expansion depending on the circumstances, and the accuracy of the speech recognition becomes extremely poor when the speech pattern includes the dropout or added noise.

Figure 9:
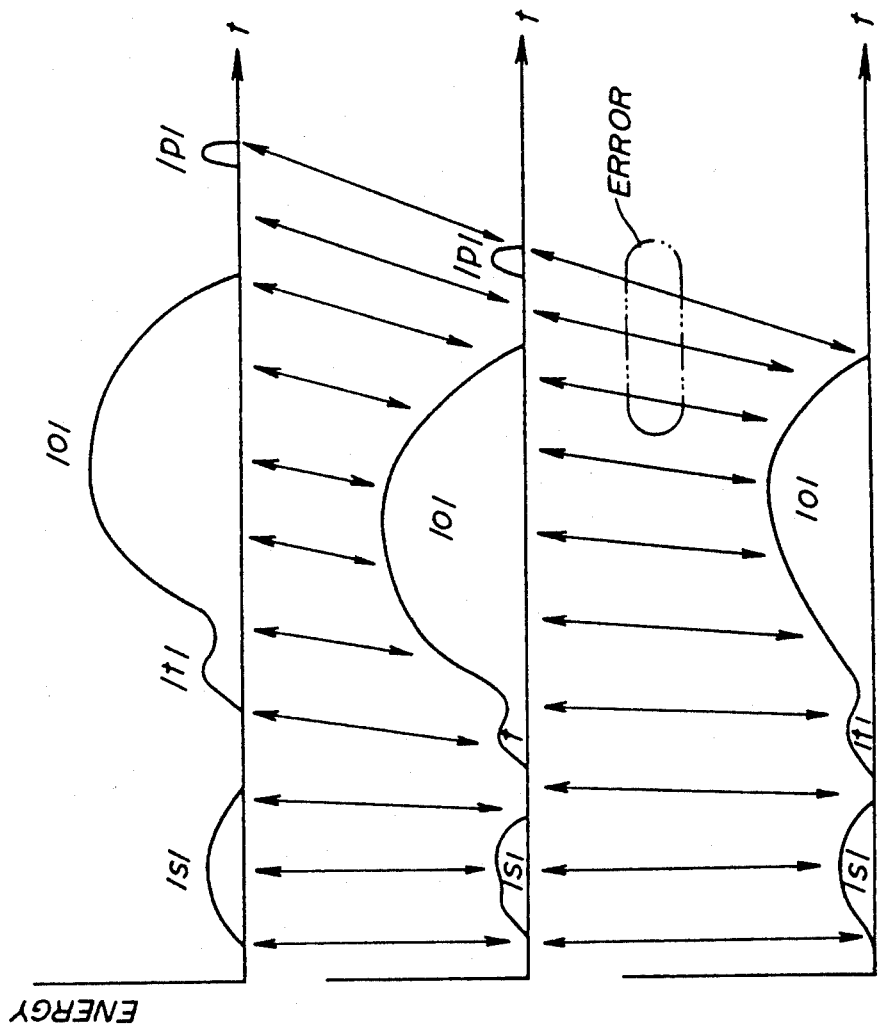
FIG. 9 is a diagram for explaining a problem which occurs when a consonant at the end of a word is not detected by the speech interval detection.

FIG. 9 is a diagram for explaining the conversion of the length of the speech pattern into a predetermined length. When normal speech patterns of a word "stop" shown in FIG. 9(A) and (B) are compared by linearly compressing or expanding the lengths of the speech patterns to the same length by time normalization, it is possible to suppress the error between the two speech patterns. However, when an unsuccessful speech interval detection is made and the "p" at the end of the speech pattern drops out as shown in FIG. 9(C), the speech pattern shown in FIG. 9(A) or (B) becomes different from the speech pattern shown in FIG. 9(C). In this case, the difference between the two speech patterns is especially large in the vicinity of the end of the speech pattern. The erroneous correspondence between the speech patterns shown in FIG. 9 (B) and (C) indicated by a two-dot chain line.

The consonant which has a small energy such as the "p" in the word "stop" is extremely difficult to detect by the speech interval detection. It is possible to carry out a satisfactory pattern matching even when the consonant of the word is not detected if the non-linear matching method is used. However, as described above, the non-linear matching method requires a large number of operations.

Next, a description will be given of a second embodiment of the pattern matching system according to the present invention, in which the pattern matching can be carried out satisfactorily using the linear matching method even when the consonant of the word is not detected.

Figure 10:
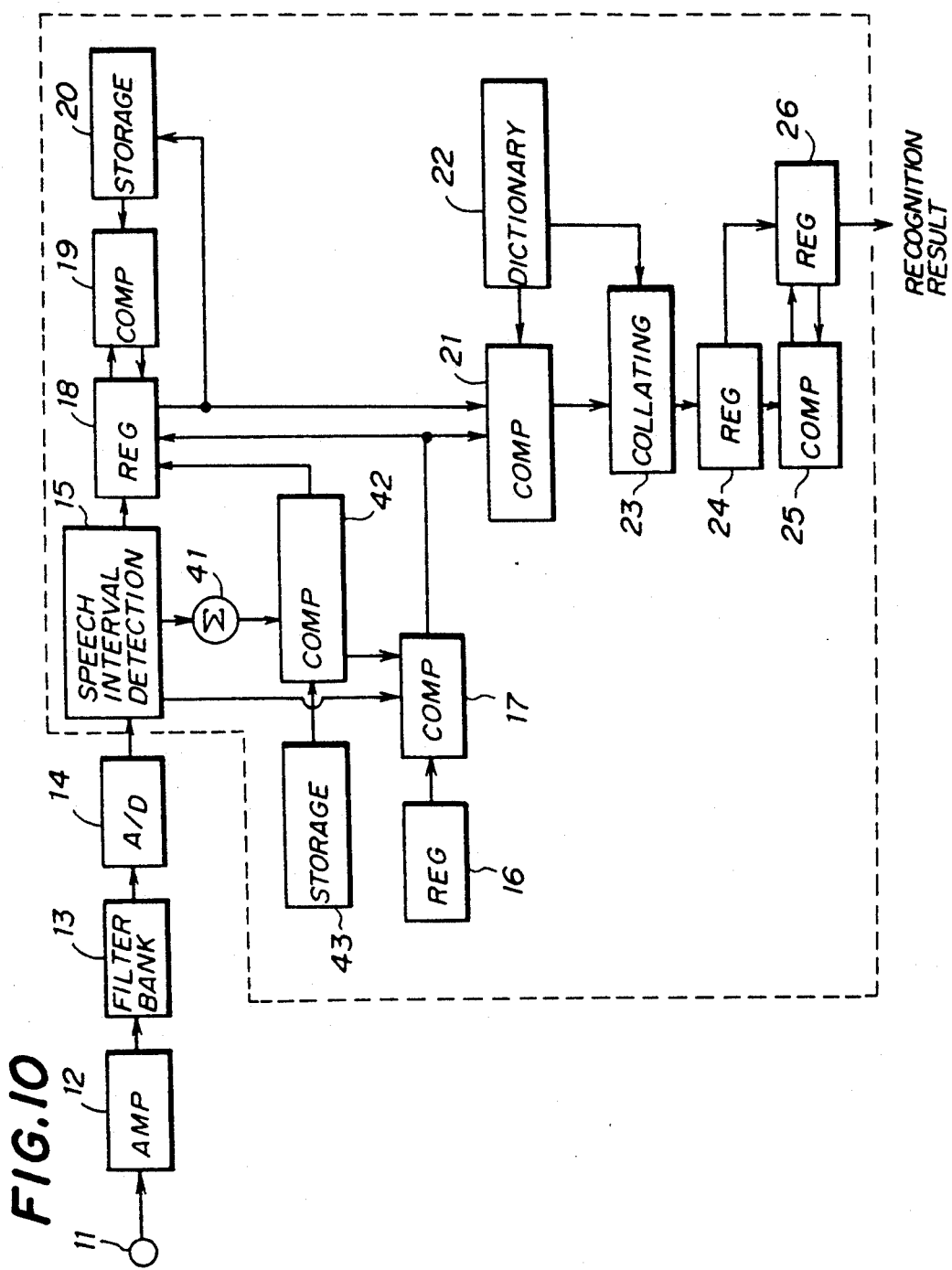
FIG. 10 is a system block diagram showing a second embodiment of the pattern matching system according to the present invention.

FIG. 10 shows the second embodiment of the pattern matching system according to the present invention applied to the speech recognition apparatus. In FIG. 10, those parts which are the same as those corresponding parts in FIG. 3 are designated by the same reference numerals, and a description thereof will be omitted.

The speech interval is detected by the speech interval detector 15 and the comparator 21 compares the binary speech pattern which is generated and compared with the speech patterns registered in the dictionary 22, similarly as in the first embodiment described in conjunction with FIG. 3. After the speech interval detection, the speech pattern is supplied from the speech interval detector 15 to a summing circuit 41 which obtains a sum of the energy of the speech pattern for each frame. The energy sum from the summing circuit 41 is compared with a predetermined energy threshold value from a threshold value storage 43, so as to detect whether or not an energy dip exists in the frame. When the energy dip exists in the frame, the energy sum from the summing circuit 41 is smaller than the predetermined energy threshold value. The energy dip corresponds to a sound such as the consonant "p" described above which easily drops out.

When the energy dip exists, the comparator 42 also detects whether the energy dip is closer to the beginning or end of the word. For example, when the energy dip is closer to the beginning of the word, this beginning portion of the word is discarded and the shortened speech pattern of the remaining part of the word is supplied to the register 18. At the same time, the same shortened speech pattern supplied to the register 18 is also supplied to the comparator 17. Thereafter, the comparator 17 and the register 18 carry out operations similarly as in the first embodiment.

After collating the shortened input speech pattern with the registered standard pattern in the collating part 23, the degree of similarity is stored in the register 24 subsequent to the last stored degree of similarity which is obtained for the complete input speech pattern. In other words, the collating takes place twice with respect to one standard pattern, that is, once using the complete input speech pattern and once using the shortened input speech pattern, and two degrees of similarity are obtained for one input speech. The larger degree of similarity is used as the degree of similarity of the input speech pattern. Finally, after collating the complete and shortened input speech patterns with all of the registered standard patterns, the word which has the maximum degree of similarity is output from the register 26 as the recognition result.

Figure 11:
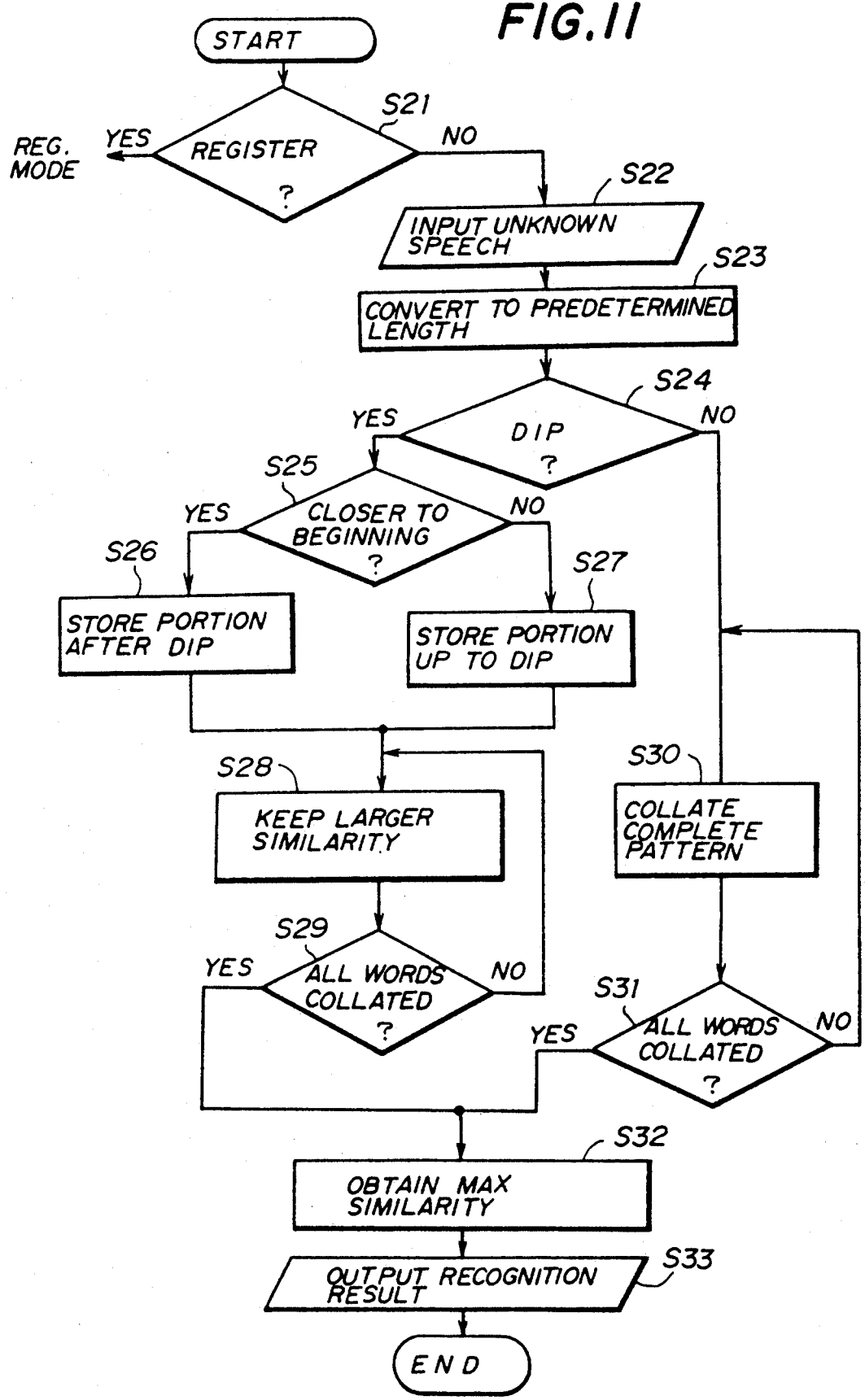
FIG. 11 is a flow chart for explaining an operation of the microcomputer when the microcomputer is used to carry out the operation of the system shown in FIG. 10.

In FIG. 10, a part of the speech recognition apparatus surrounded by a phantom line may be realized by a combination of a microcomputer and a memory. FIG. 11 is a flow chart for explaining an operation of the microcomputer when this combination is employed.

In this embodiment, it is not essential to convert the input speech pattern into two or more frame lengths as in the first embodiment. Hence, it will be assumed for the sake of convenience that the input speech pattern is only converted into one frame length.

In FIG. 11, a step S21 judges whether or not the speech recognition apparatus is in the registration mode. When the judgement result in the step S21 is NO, a step S22 inputs the unknown input speech and a step S23 converts the input speech into an input speech pattern having a predetermined frame length and stores this input speech pattern. Then, a step S24 judges whether or not an energy dip which is less than a predetermined level exists in the input speech pattern. The predetermined level which is used for detecting the energy dip is determined based on the energy level when no speech is input.

When the judgement result in the step S24 is YES, a step S25 judges whether or not the energy dip is closer to the beginning of the word. When the judgement result in the step S25 is YES, a step S26 converts the input speech pattern corresponding to a portion of the word after the energy dip to the end of the word into a predetermined frame length and stores this input speech pattern. On the other hand, when the judgement result in the step S25 is NO, a step S27 converts the input speech pattern corresponding to a portion of the word from the beginning of the word to immediately before the energy dip into a predetermined frame length and stores this input speech pattern.

After the step S26 or S27, a step S28 collates the shortened input speech pattern and the complete input speech pattern with the same registered standard pattern so as to obtain two degrees of similarity, and keeps the larger degree of similarity.

A step S29 judges whether or not the complete and shortened input speech patterns are collated with all of the standard patterns. The step S28 is repeated when the judgement result in the step S29 is NO. But when the judgement result in the step S29 becomes YES, a step S32 obtains the maximum degree of similarity which is obtained for the input speech. A step S33 outputs the word which has the maximum degree of similarity from the register 26 as the recognition result, and the process ends.

On the other hand, when the judgement result in the step S24 is NO, a step S30 collates the complete input speech pattern with the standard pattern, and a step S31 judges whether or not the complete input speech pattern is collated with all of the standard patterns. The step S30 is repeated when the judgement result in the step S31 is NO. When the judgement result in the step S31 becomes YES, the process advances to the step S32.

When the judgement result in the step S21 is YES, the speech recognition apparatus is in the registration mode for registering standard patterns of words in the dictionary.

Figure 12:
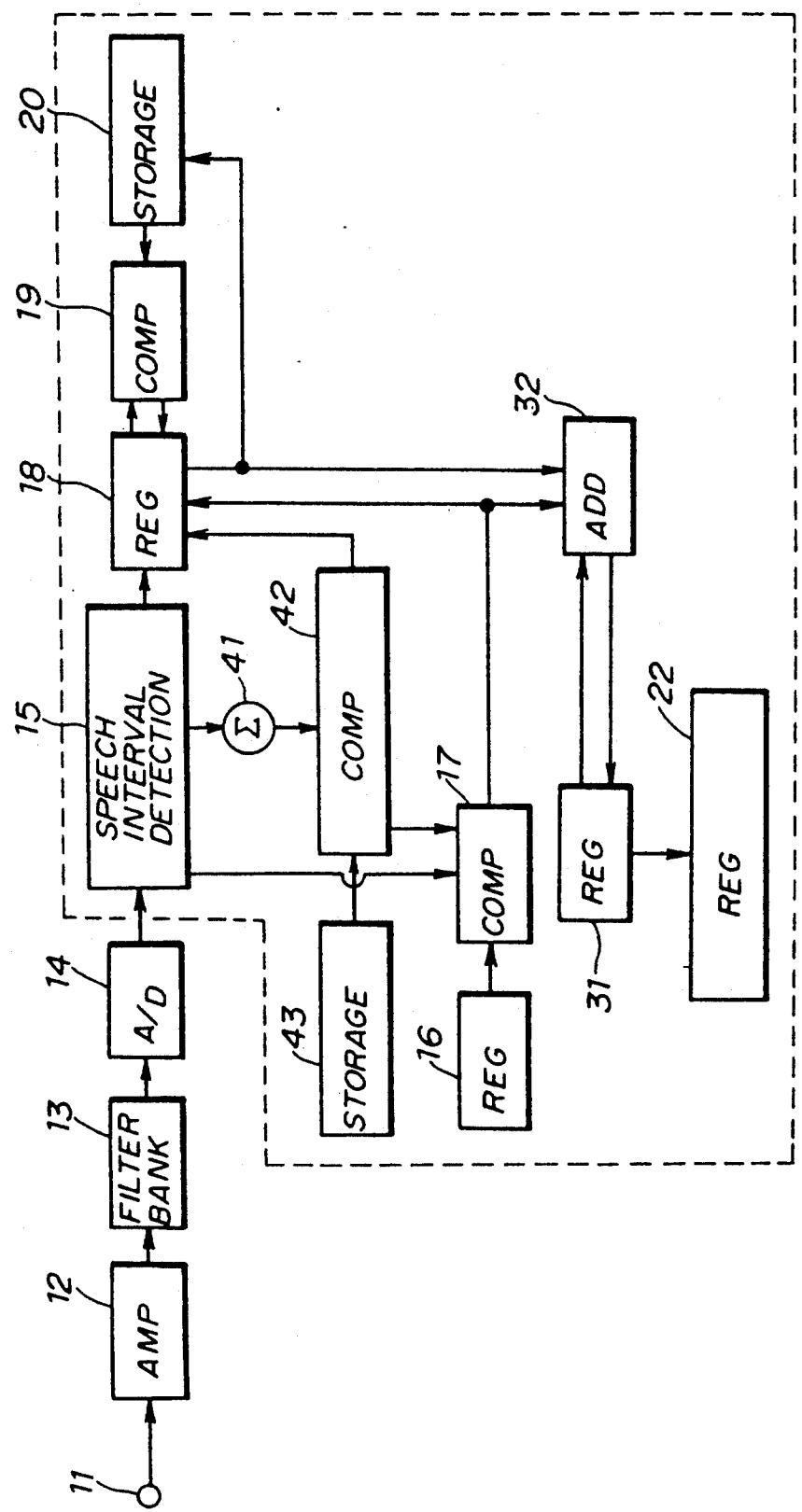
FIG. 12 is a system block diagram showing only an essential part of the speech recognition apparatus related to registration of standard patterns.

Next, a description will be given of a process of registering the standard patterns in the dictionary. FIG. 12 shows only an essential part of the speech recognition apparatus related to the registration of the standard patterns. In FIG. 12, those parts which are the same as those corresponding parts in FIGS. 7 and 10 are designated by the same reference numerals, and a description thereof will be omitted.

The operation of the system shown in FIG. 12 is basically the same as that of the systems shown in FIGS. 7 and 10. Of course, the input speech pattern corresponding to a portion of the word after the energy dip to the end of the word is converted into a predetermined frame length when the energy dip is located at the beginning of the word. On the other hand, when the energy dip is located at the end of the word, the input speech pattern corresponding to a portion of the word from the beginning of the word to immediately before the energy dip is converted into a predetermined frame length.

Figure 13:
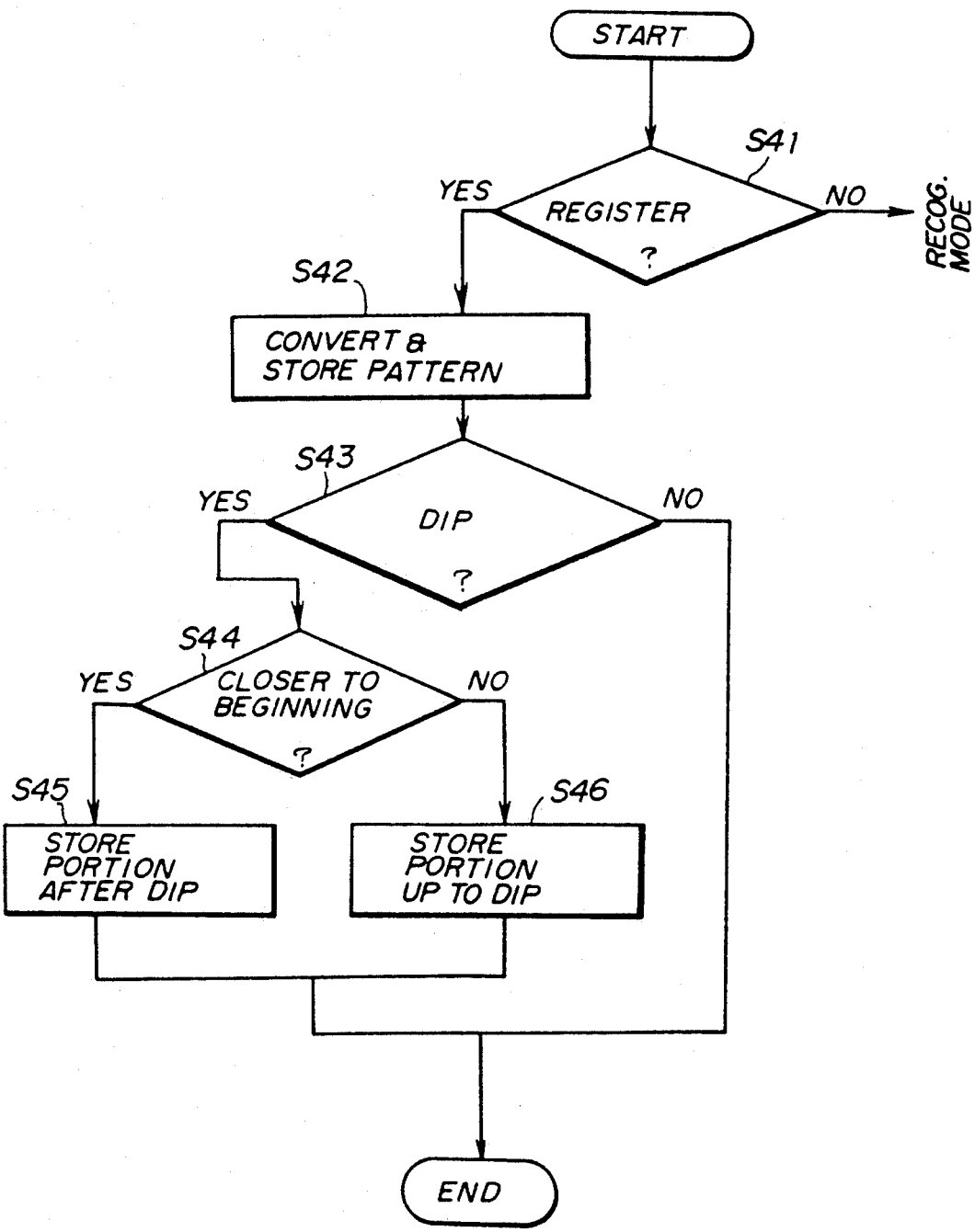
FIG. 13 is a flow chart for explaining an operation of the microcomputer when the microcomputer is used to carry out the operation of the system shown in FIG. 12.

In FIG. 12, a part of the speech recognition apparatus surrounded by a phantom line may be realized by a combination of a microcomputer and a memory. FIG. 13 is a flow chart for explaining an operation of the microcomputer when this combination is employed.

In FIG. 13, a step S41 judges whether or not the speech recognition apparatus is in the registration mode. When the judgement result in the step S41 is YES, a step S42 converts the speech pattern of the input speech into a predetermined frame length and registers this speech pattern as the standard pattern. A step S43 judges whether or not an energy dip exists in the speech pattern. The process ends, that is, the registration of this input speech ends, when the judgement result in the step S43 is NO.

On the other hand, when the judgement result in the step S43 is YES, a step S44 judges whether or not the energy dip is closer to the beginning of the word. When the judgement result in the step S44 is YES, a step S45 converts the input speech pattern corresponding to a portion of the word after the energy dip to the end of the word into a predetermined frame length and registers this input speech pattern as the standard pattern. On the other hand, when the judgement result in the step S44 is NO, a step S46 converts the input speech pattern corresponding to a portion of the word from the beginning of the word to immediately before the energy dip into a predetermined frame length and stores this input speech pattern as the standard pattern. Hence, when the judgement result in the step S42 is YES, two kinds of standard patterns are registered in the dictionary with respect to one input speech. In other words, a standard pattern is registered with respect to the complete input speech pattern and a standard pattern is registered with respect to the shortened input speech pattern.

According to the second embodiment, it is possible to improve the accuracy of the speech recognition because a corresponding standard pattern is also registered for the input speech a part of which easily drops out. The accuracy of the speech recognition is considerably improved especially when the first and second embodiments are combined.

Next, a description will be given of a third embodiment of the pattern matching system according to the present invention, in which the pattern matching can be carried out satisfactorily using the linear matching method even when the consonant of the word is not detected.

Figure 14:
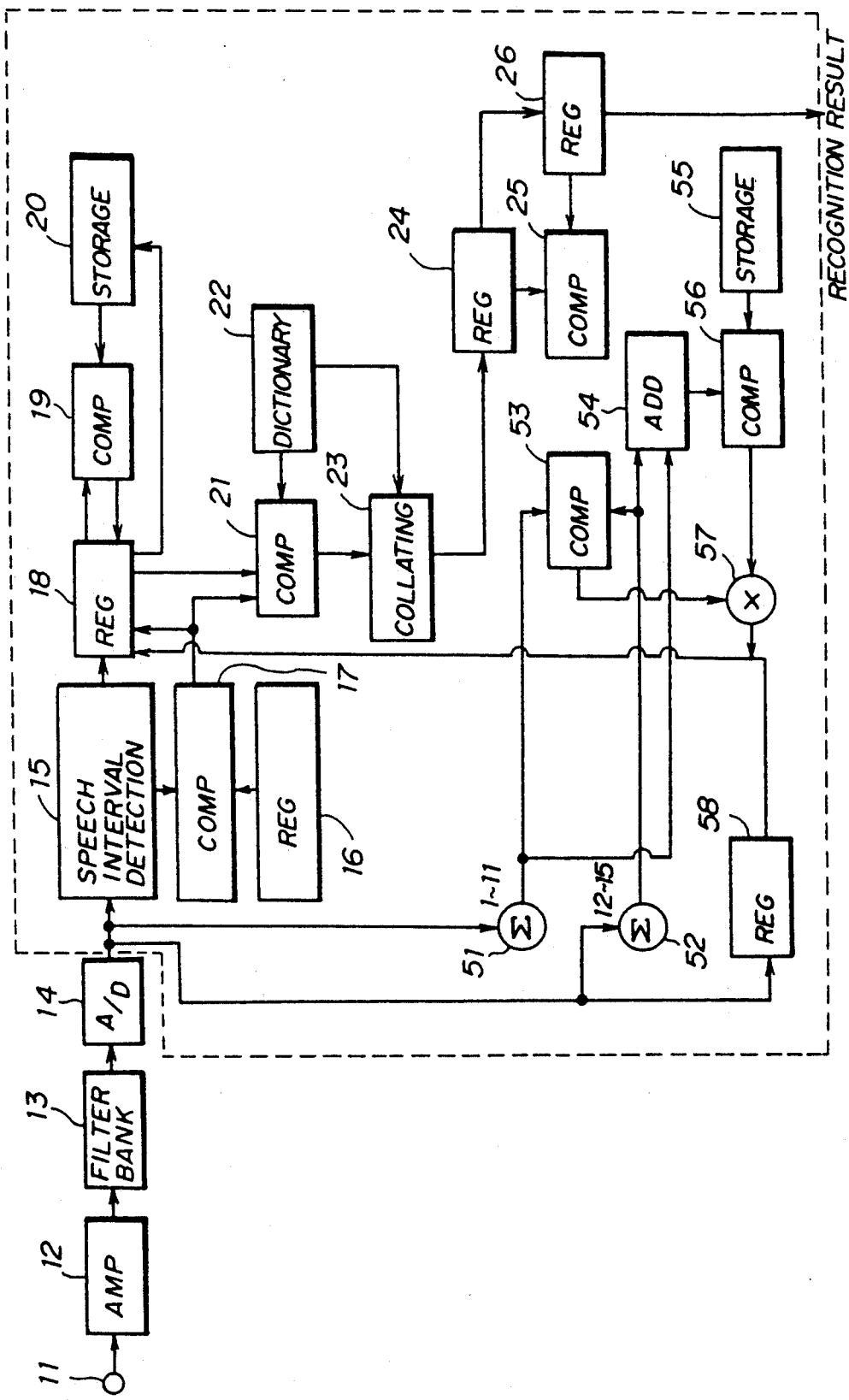
FIG. 14 is a system block diagram showing a third embodiment of the pattern matching system according to the present invention.

FIG. 14 shows the third embodiment of the pattern matching system according to the present invention applied to the speech recognition apparatus. In FIG. 14, those parts which are the same as those corresponding parts in FIG. 10 are designated by the same reference numerals, and a description thereof will be omitted.

The second embodiment detects a part of the input speech where the energy dip exists. But in this third embodiment, a part of the input speech where the energy dip exists and the spectral component is concentrated in the high frequency region is detected. This is because the consonant which is difficult to detect by the speech interval detection has a relatively small energy and the frequency components concentrate in the high frequency region.

It is assumed for the sake of convenience that the bandpass filter bank 13 includes 15 bandpass filters ranging from a minimum center frequency of 250 Hz to a maximum center frequency of 6500 Hz at ⅓ octaves. The output signals of the A/D converter 14 corresponding to the first through eleventh bandpass filters in the low frequency region are summed in a summing circuit 51, while the output signals of the A/D converter 14 corresponding to the twelfth through fifteenth bandpass filters are summed in a summing circuit 52. A comparator 53 compares output sums of the summing circuits 51 and 52, and outputs a signal "1" when the output sum of the summing circuit 52 is greater than that of the summing circuit 51. Otherwise, the comparator 53 outputs a signal "0".

This embodiment detects the concentration of the spectral components in the high frequency region by dividing the analyzing frequency band into two regions. However, any other suitable methods may be used to detect the concentration of the spectral components in the high frequency region. For example, the concentration may be detected when the analyzing frequency band is divided into two regions and the high-frequency components are several times the low-frequency components, or the concentration may be detected when a fitting line is drawn along the frequency axis direction of the spectral distribution and the fitting line has a negative inclination.

An adder 54 adds the output sums of the summing circuits 51 and 52, and supplies an added value to a comparator 56. The comparator 56 outputs a signal "1" when the added value is smaller than a predetermined threshold value stored in a threshold value storage 55, and otherwise outputs a signal "0". This predetermined threshold value is used to detect the energy dip, and for example, is set to approximately 1/5 the energy level which is obtained when a vowel is input. A multiplier 57 multiplies the output signals of the comparators 53 and 56, and the unknown input speech pattern which is temporarily stored in a register 58 is transferred to the register 18 when the multiplier 57 outputs a signal "1". Thereafter, the recognition result is obtained similarly as in the first and second embodiments.

Figure 15:
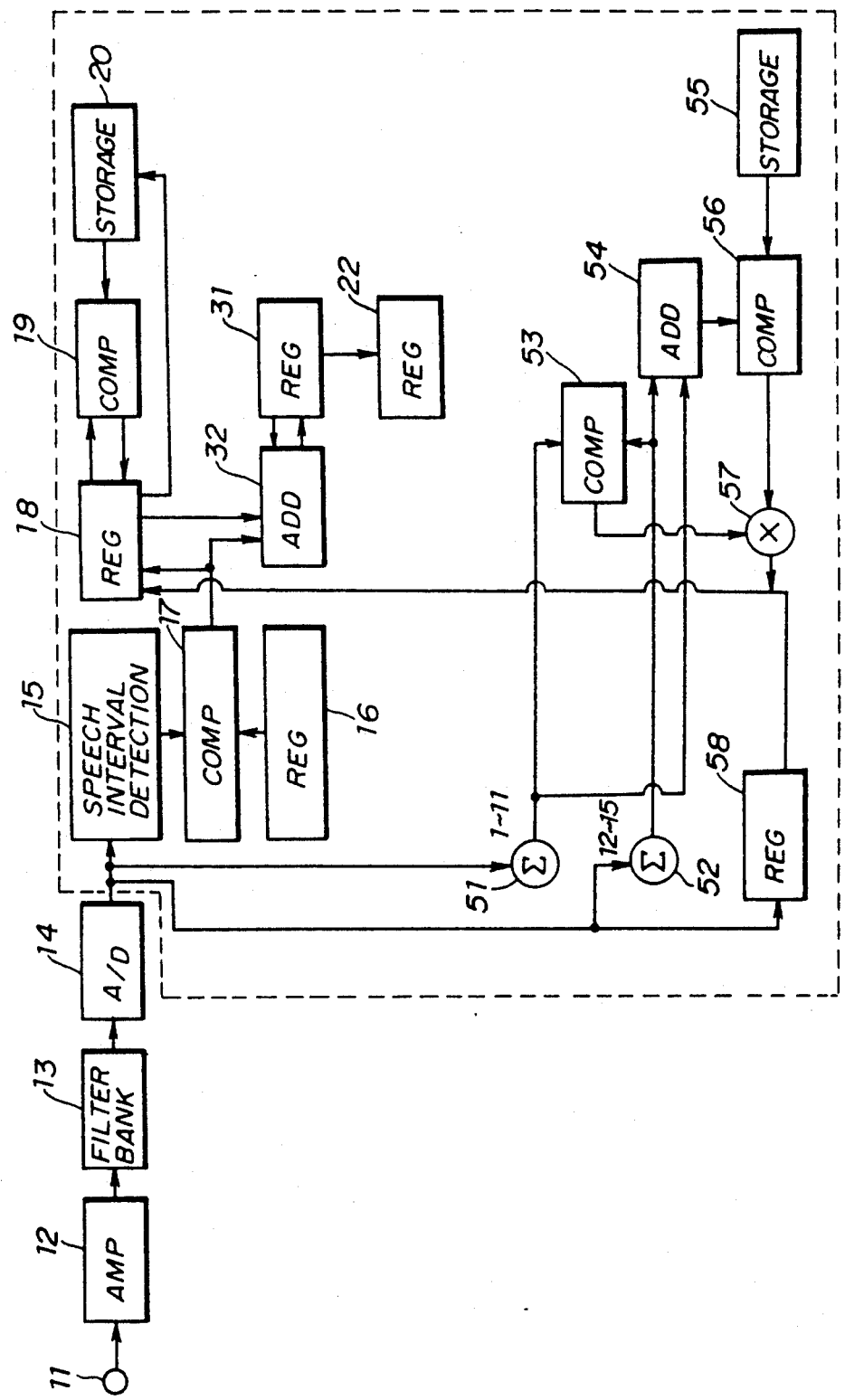
FIG. 15 is a system block diagram showing only an essential part of the speech recognition apparatus related to registration of standard patterns.

Next, a description will be given of a process of registering the standard patterns in the dictionary. FIG. 15 shows only an essential part of the speech recognition apparatus related to the registration of the standard patterns. In FIG. 15, those parts which are the same as those corresponding parts in FIG. 14 are designated by the same reference numerals, and a description thereof will be omitted.

The operation of the system shown in FIG. 15 is basically the same as that of the systems shown in FIGS. 12 and 14. Of course, the input speech pattern corresponding to a portion of the word after the energy dip to the end of the word is converted into a predetermined frame length when the energy dip is located at the beginning of the word where the spectral components in the high frequency region are concentrated. On the other hand, the input speech pattern corresponding to a portion of the word from the beginning of the word to immediately before the energy dip is converted into a predetermined frame length when the energy dip is located at the end of the word where the spectral components in the high frequency region are concentrated.

In FIGS. 14 and 15, a part of the speech recognition apparatus surrounded by a phantom line may be realized by a combination of a microcomputer and a memory. FIG. 16 is a flow chart for explaining an operation of the microcomputer when this combination is employed.

In this embodiment, it is not essential to convert the input speech pattern into two or more frame lengths as in the first embodiment. Hence, it will be assumed for the sake of convenience that the input speech pattern is only converted into one frame length.

In FIG. 16, a step S51 judges whether or not the input speech pattern has a specific part where the energy dip exists and the spectral components in the high frequency region are concentrated. When the judgement result in the step S51 is YES, a step S52 normalizes the input speech pattern into a predetermined frame length. A step S53 removes the specific part of the input speech pattern, and a step S54 normalizes the input speech pattern excluding the specific part into the predetermined frame length.

After the step S54, a step S56 collates the two input speech patterns which are related to the same input speech with the standard patterns registered in the dictionary. A step S57 calculates the degree of similarity for the two input speech patterns with respect to all of the standard patterns. A step S58 outputs the word having the maximum degree of similarity as the recognition result and the process ends.

On the other hand, when the judgement result in the step S51 is NO, a step S55 normalizes the input speech pattern into the predetermined length, and the step S56 collates the input speech pattern with the standard patterns registered in the dictionary. Thereafter, the steps S57 and S58 are carried out similarly as described above.

The speech recognition apparatus in the registration mode operates similarly as in the case of the second embodiment, except that the third embodiment detects the specific part of the word components in the high frequency region are concentrated. However, this difference is evident from FIG. 14.

According to the third embodiment, it is possible to improve the accuracy of the speech recognition because a corresponding standard pattern is also registered for the input speech a part of which easily drops out. The accuracy of the speech recognition is considerably improved especially when the first and third embodiments are combined.

In the described embodiments, the method of determining the degree of similarity is not limited to that described therein.

Further, the present invention is not limited to these embodiments, but various variations and modifications may be made without departing from the scope of the present invention.

What is claimed is:

1. A pattern matching system especially suitable for a speech recognition apparatus, said pattern matching system comprising:
   dictionary means for storing standard speech patterns, each of said standard speech patterns being stored in said dictionary means with two or more different pattern lengths;
   converting means for converting an input speech pattern which has an arbitrary pattern length into at least one converted speech pattern which has one of the pattern lengths with which the standard speech patterns are stored in said dictionary means depending on said arbitrary pattern lengths; and
   collating means for collating the converted speech pattern with the standard speech patterns stored in said dictionary means to obtain a standard speech pattern which has a largest degree of similarity to the converted speech pattern.

2. The pattern matching system as claimed in claim 1, wherein:
   a) said dictionary means stores each standard speech pattern in three mutually different pattern lengths $L_1$, $L_2$, and $L_3$; and
   b) said converting means converts the input speech pattern into the converted speech pattern having:
      1) the pattern length $L_1$ when $L > L_a$;
      2) the pattern length $L_2$ when $L_a \geq L \geq L_b$; and
      3) the pattern length $L_3$ when $L_a > L$;
   wherein:

L denotes the arbitrary pattern length of the input speech pattern;
   $L_a$ and $L_b$ are two arbitrary length thresholds; and
   $L_a > L_b$.

3. The pattern matching system as claimed in claim 1, wherein;
   a) said dictionary means stores each standard speech pattern in three mutually different pattern lengths $L_1$, $L_2$, and $L_3$;
   b) and said converting means converts the input speech pattern into the converted speech pattern having:
      1) the pattern length $L_1$ when both conditions $L > L_a$ and $L > L_a + (L_a - L_b)/2$ are satisfied:
      2) the pattern lengths $L_1$ and $L_2$ when both conditions $L > L_a$ and $L \leq L_a$ and $+(L_a - L_b)/2$ are satisfied;
      3) the pattern lengths $L_1$ and $L_2$ when both conditions $L_a \geq L \geq L_b$ and $L > L_b + (L_a - L_b)/2$ are satisfied;
      4) the pattern lengths $L_2$ and $L_3$ when both conditions $L_a \geq L \geq L_b$ and $L \leq L_b + (L_a - L_b)/2$ are satisfied;
      5) the pattern lengths $L_2$ and $L_3$ when both conditions $L_b > L$ and $L > L_b - (L_a - L_b)/2$ are satisfied; and
      6) the pattern lengths $L_2$ and $L_3$ when both conditions $L_b > L_a$ and $L \leq L_b - (L_a - L_b)/2$ are satisfied;
   wherein:
   L denotes the arbitrary pattern length of the input speech pattern; and
   $L_a$ and $L_b$ are two arbitrary length thresholds.

4. The pattern matching system as claimed in claim 1, wherein said collating means collates the converted speech pattern only with the standard speech patterns which have the same pattern length as the converted speech pattern.

5. The pattern matching system as claimed in claim 1, further comprising:
   storing means for storing the standard speech patterns in said dictionary means;
   wherein said dictionary means stores each standard speech pattern in three mutually different pattern lengths $L_1$, $L_2$ and $L_3$; and
   wherein said storing means converts a registering speech pattern which is to be registered into the standard speech pattern having:
      1) the pattern length $L_1$ when $L > L_a$;
      2) the pattern length $L_2$ when $L_a \geq L \geq L_b$; and
      3) the pattern length $L_3$ when $L_b > L$;
   wherein:
   L denotes a pattern length of the registering speech pattern;
   $L_a$ and $L_b$ are two arbitrary length thresholds; and
   $L_a > L_b$.

6. The pattern matching system as claimed in claim 1, further comprising:
   storing means for storing the standard speech patterns in said dictionary means;
   wherein said dictionary means stores each standard speech pattern in three mutually different pattern lengths $L_1$, $L_2$ and $L_3$; and
   said storing means converts a registering speech pattern which is to be registered into the standard speech pattern having:
      1) the pattern length $L_1$ when both conditions $L > L_a$ $L > L_a + (L_a - L_b)/2$ are satisfied;

2) the pattern lengths $L_1$ and $L_2$ when both conditions $L > L_a$ and $L \leq L_a + (L_a - L_b)/2$ are satisfied;

3) the pattern lengths $L_1$ and $L_2$ when both conditions $L_a \geq L \geq L_b$ and $L > L_b + (L_a - L_b)/2$ are satisfied;

4) the pattern lengths $L_2$ and $L_3$ when both conditions $L_a \geq L \geq L_b$ and $L \leq L_b + (L_a - L_b)/2$ are satisfied;

5) the pattern lengths $L_2$ and $L_3$ when both conditions $L_b > L$ and $L > L_b - (L_a - L_b)/2$ are satisfied; and 6) the pattern lengths $L_2$ and $L_3$ when both conditions $L_b > L_a$ and $L \leq L_b - (L_a - L_b)/2$ are satisfied;

wherein:

L denotes the arbitrary pattern length of the input speech pattern; and $L_a$ and $L_b$ are two arbitrary length thresholds.

7. The pattern matching system as claimed in claim 1, wherein said dictionary means stores first and second standard speech patterns with respect to one word when an energy level at one of beginning and end parts of the word is lower than a predetermined level, said first standard pattern corresponding to the entire word, said second standard pattern corresponding to the word excluding the one of beginning and end parts.

8. The pattern matching system as claimed in claim 7, wherein said collating means collates the converted speech pattern with both said first and second standard patterns and recognizes said one word as having the largest degree of similarity when one of said first and second standard patterns has a largest degree of similarity out of all of the standard patterns stored in said dictionary means.

9. The pattern matching system as claimed in claim 7, wherein said predetermined level is determined based on an energy level for no speech input.

10. The pattern matching system as claimed in claim 1, wherein said dictionary means stores first and second standard speech patterns with respect to one word when an energy level at one of beginning and end parts of the word is lower than a predetermined level and has spectral components concentrated in a high frequency region, said first standard pattern corresponding to the entire word, said second standard pattern corresponding to the word excluding the one of beginning and end parts.

11. The pattern matching system as claimed in claim 10, wherein said collating means collates the converted speech pattern with both said first and second standard patterns and recognizes said one word as having the largest degree of similarity when one of said first and second standard patterns has a largest degree of similarity out of all of the standard patterns stored in said dictionary means.

12. The pattern matching system as claimed in claim 11, wherein said predetermined level is lower than an energy level of a vowel.

13. The pattern matching system as claimed in claim 12, wherein said predetermined level is approximately 1/5 an energy level of a vowel.

14. A pattern matching system especially suitable for a speech recognition apparatus, said pattern matching system comprising:

a) dictionary means for storing first and second standard speech patterns having a predetermined pattern length with respect to one word when an energy level at one of beginning and end parts of the word is lower than a predetermined level, wherein:

1) said first standard pattern corresponds to the entire word; and 2) said second standard pattern corresponds tot he word excluding the one of beginning and end parts;

b) converting means for converting an input speech pattern which has an arbitrary pattern length into a converted speech pattern which has the predetermined pattern lengths; and c) collating means for collating the converted speech pattern with both the first and second standard speech patterns stored in said dictionary means and recognizing a predetermined word as having the largest degree of similarity when one of said first and second standard patterns corresponding to said predetermined word has a largest degree of similarity out of all of the standard patterns stored in said dictionary means.

15. A pattern matching system especially suitable for a speech recognition apparatus, said pattern matching system comprising:

a) dictionary means for storing first and second standard speech patterns having a predetermined pattern length with respect to one word when an energy level at one of beginning and end parts of the word is lower than a predetermined level and has spectral components concentrated in a high frequency region, wherein:

1) said first standard pattern corresponds to the entire word; and 2) said second standard pattern corresponds to the word excluding the one of beginning and end parts;

b) converting means for converting an input speech pattern which has an arbitrary pattern length into a converted speech pattern which has the predetermined pattern lengths; and c) collating means for collating the converted speech pattern with both the first and second standard patterns stored in said dictionary mans and recognizing a predetermined word as having the largest degree of similarity out of all of the standard patterns stored in said dictionary means.

16. The pattern matching system as claimed in claim 15, wherein said predetermined level is lower than an energy level of a vowel.

17. The pattern matching system as claimed in claim 16, wherein said predetermined level is approximately 1/5 an energy level of a vowel.

* * * * *